US008558887B2

(12) United States Patent
Plaster

(10) Patent No.: US 8,558,887 B2
(45) Date of Patent: Oct. 15, 2013

(54) VIRTUAL GUARD GATE FOR A GATED COMMUNITY AND METHOD THEREFOR

(76) Inventor: Morgan Plaster, Las Vegas, NV (US)

( * ) Notice: Subject to any disclaimer, the term of this patent is extended or adjusted under 35 U.S.C. 154(b) by 1218 days.

(21) Appl. No.: 12/354,149

(22) Filed: Jan. 15, 2009

(65) Prior Publication Data
US 2010/0175323 A1    Jul. 15, 2010

(51) Int. Cl.
*H04N 7/18* (2006.01)
(52) U.S. Cl.
USPC .............................. 348/143; 348/152; 348/159
(58) Field of Classification Search
USPC .................................. 348/143, 156, 152, 159
See application file for complete search history.

(56) References Cited

U.S. PATENT DOCUMENTS

| 3,628,027 | A | * | 12/1971 | Brauss | 250/216 |
| 4,947,353 | A | * | 8/1990 | Quinlan, Jr. | 702/158 |
| 5,638,302 | A | | 6/1997 | Gerber | |
| 6,069,558 | A | | 5/2000 | Kershaw | |
| 6,504,479 | B1 | * | 1/2003 | Lemons et al. | 340/541 |
| 6,513,119 | B1 | | 1/2003 | Wenzel | |
| 2005/0238424 | A1 | | 10/2005 | Burns et al. | |
| 2006/0208883 | A1 | * | 9/2006 | Kong et al. | 340/556 |
| 2008/0007621 | A1 | | 1/2008 | Ying et al. | |
| 2008/0226391 | A1 | | 9/2008 | Phillips et al. | |
| 2010/0013917 | A1 | * | 1/2010 | Hanna et al. | 348/143 |

* cited by examiner

Primary Examiner — Lynn Feild
Assistant Examiner — Lin Liu
(74) Attorney, Agent, or Firm — Weiss & Moy, P.C.; Jeffrey D. Moy

(57) ABSTRACT

A virtual guard gate for a gated community has at least one camera positioned proximate an entrance gate of the gated community. A monitoring station monitor is provided for displaying images captured by the at least one camera located in an off site monitoring station. Receivers are located in a plurality of homes of the gated community for receiving the images captured by the at least one camera. An access device is located in the monitoring station and in each house within the gated community. The access device is used for opening the entrance gate when the images have been verified by one of an individual in the monitoring station or in one of the homes.

6 Claims, 6 Drawing Sheets

US 8,558,887 B2

VIRTUAL GUARD GATE FOR A GATED COMMUNITY AND METHOD THEREFOR

FIELD OF THE INVENTION

The present invention relates to security systems, and more specifically, to a system for automating the security of a gated community through the use of a sophisticated array of cameras and photoelectric beams combined with an automated entrance gate, all of which are monitored by a third party monitoring company located off site.

BACKGROUND OF THE INVENTION

A more secure neighborhood has proven to be a commodity which many people desire. Because of this, many people like to live in gated communities. However, many gated communities have unsupervised entrances. This allows many unauthorized vehicles to enter the gated community.

To help ensure security, it is typically necessary to employ several security agents and place them at one or more guard stations on the property. This is an ongoing and continuing expense, greatly adding to the cost of running and maintaining the security system.

Therefore, it would be beneficial to provide a virtual guard gate for a gated community and method therefor. The device and method should provide an automated system for allowing access for authorized users and vehicles while denying access to unrecognized or unauthorized users and vehicles.

SUMMARY OF THE INVENTION

In accordance with one embodiment, a virtual guard gate for a gated community is disclosed. The virtual guard gate for a gated community has at least one camera positioned proximate an entrance gate of the gated community. A monitoring station monitor is provided for displaying images captured by the at least one camera located in an off site monitoring station. Receivers are located in a plurality of homes of the gated community for receiving the images captured by the at least one camera. An access device is located in the monitoring station and in each house within the gated community. The access device is used for opening the entrance gate when the images have been verified by one of an individual in the monitoring station or in one of the homes.

The features, functions, and advantages can be achieved independently in various embodiments of the disclosure or may be combined in yet other embodiments.

BRIEF DESCRIPTION OF THE DRAWINGS

Embodiments of the disclosure will become more fully understood from the detailed description and the accompanying drawings, wherein.

DETAILED DESCRIPTION OF THE PREFERRED EMBODIMENTS

Figure 1:
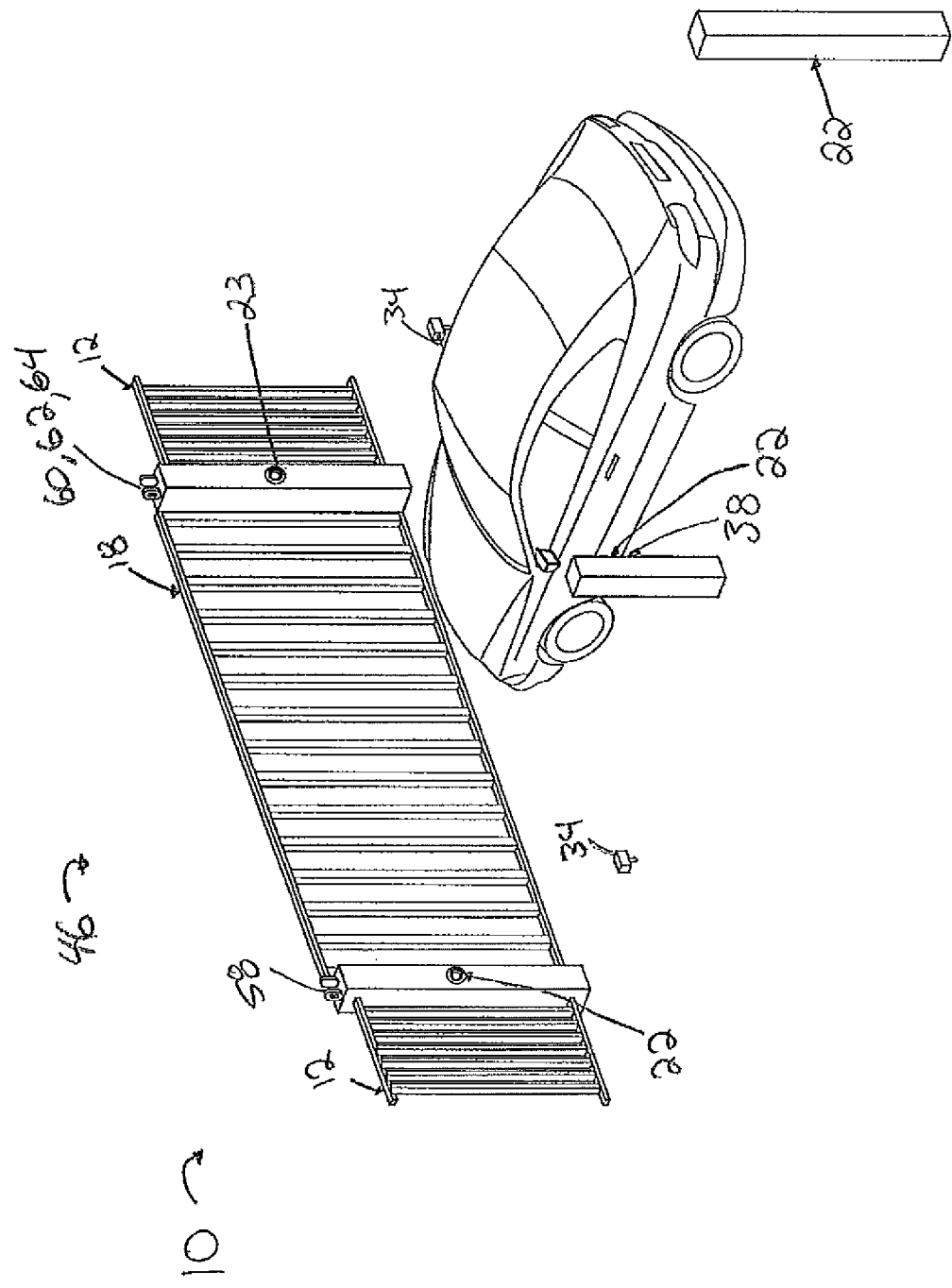
FIG. 1 is an elevated perspective view of a vehicle proximate the entrance gate.
Figure 2:
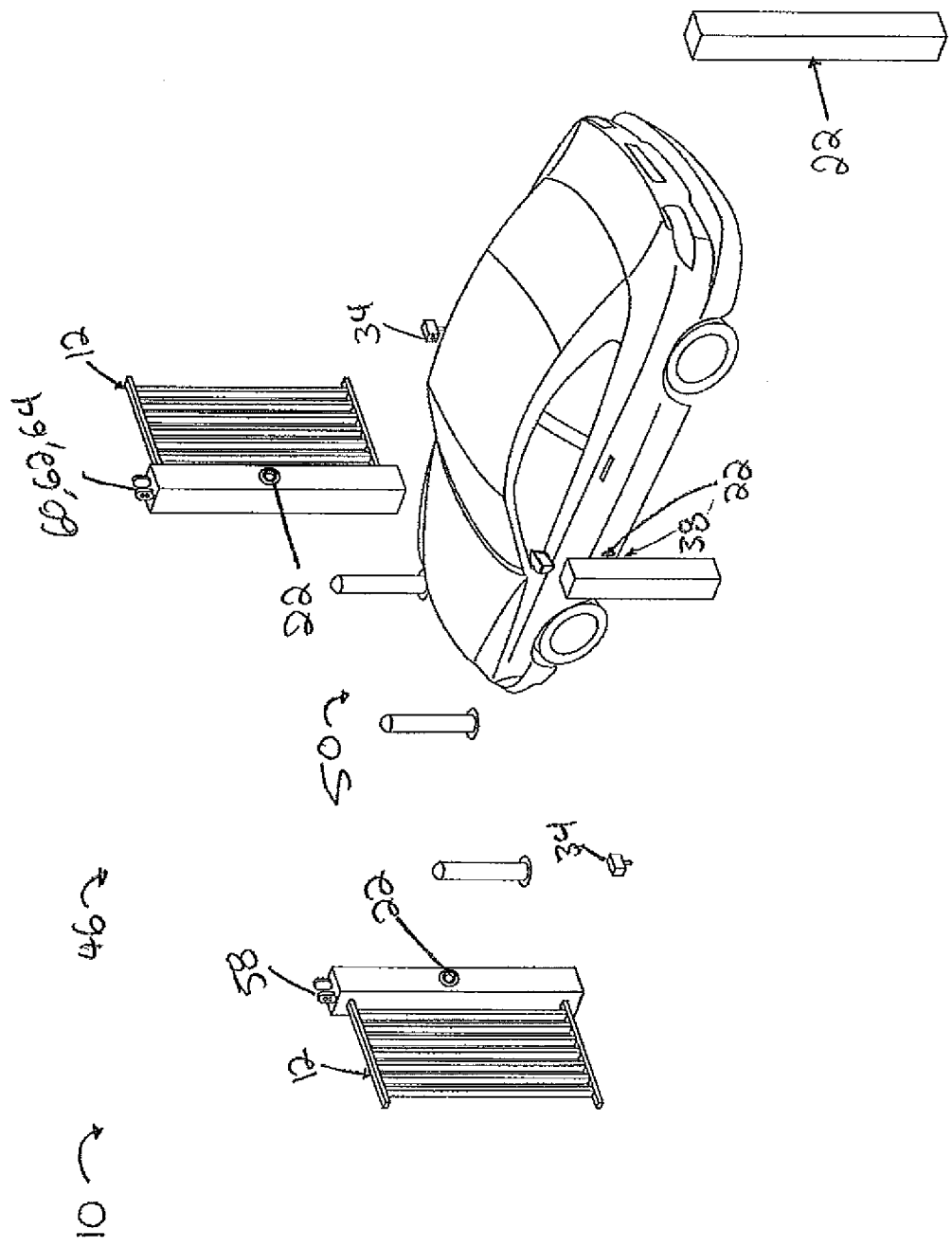
FIG. 2 is an elevated perspective view of the entrance gate following erection of the stopping device.
Figure 3:
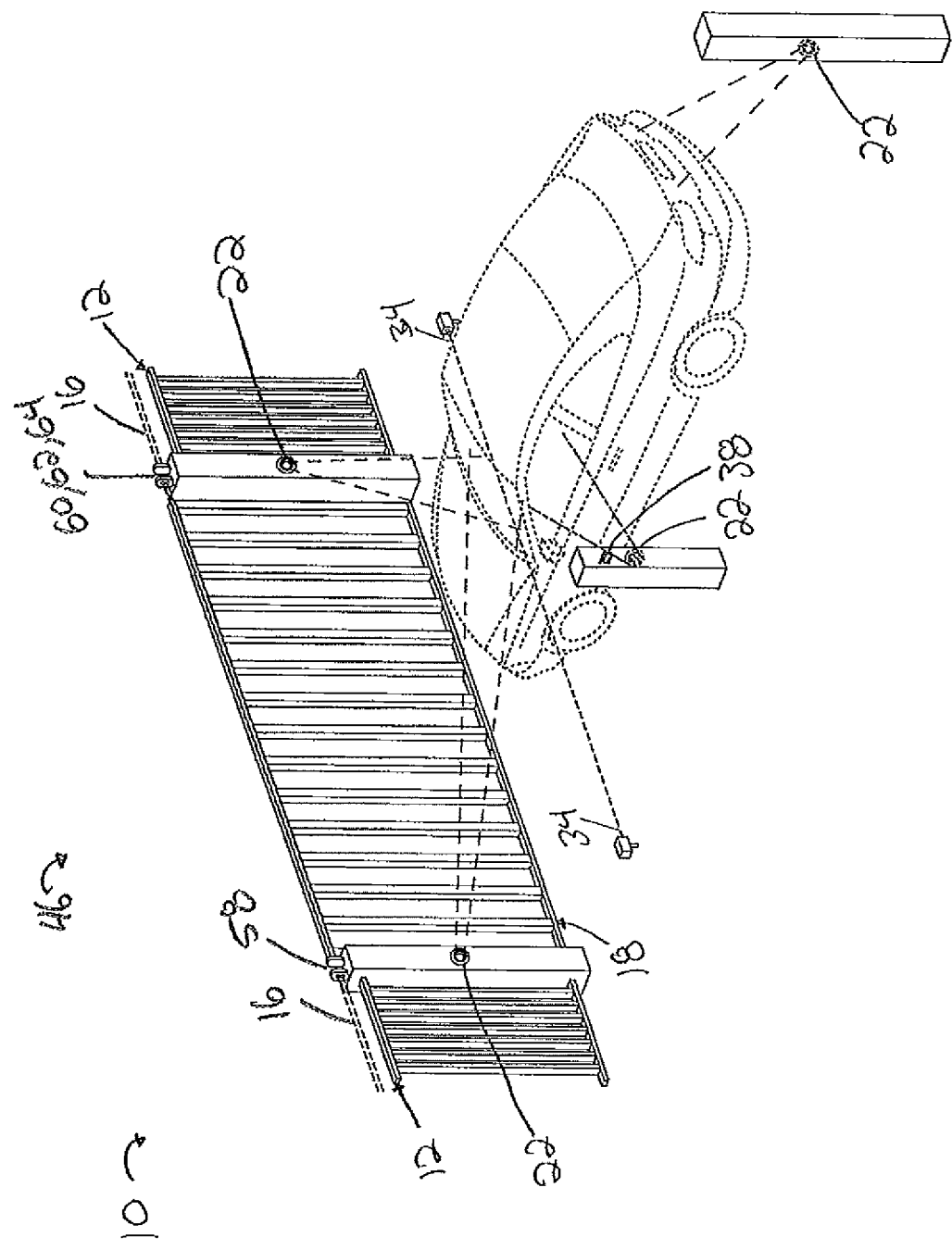
FIG. 3 is an elevated perspective view of the entrance gate demonstrating the line of sight of the various cameras and also demonstrating the photoelectric entrance beam used in conjunction with the stopping device.
Figure 4:
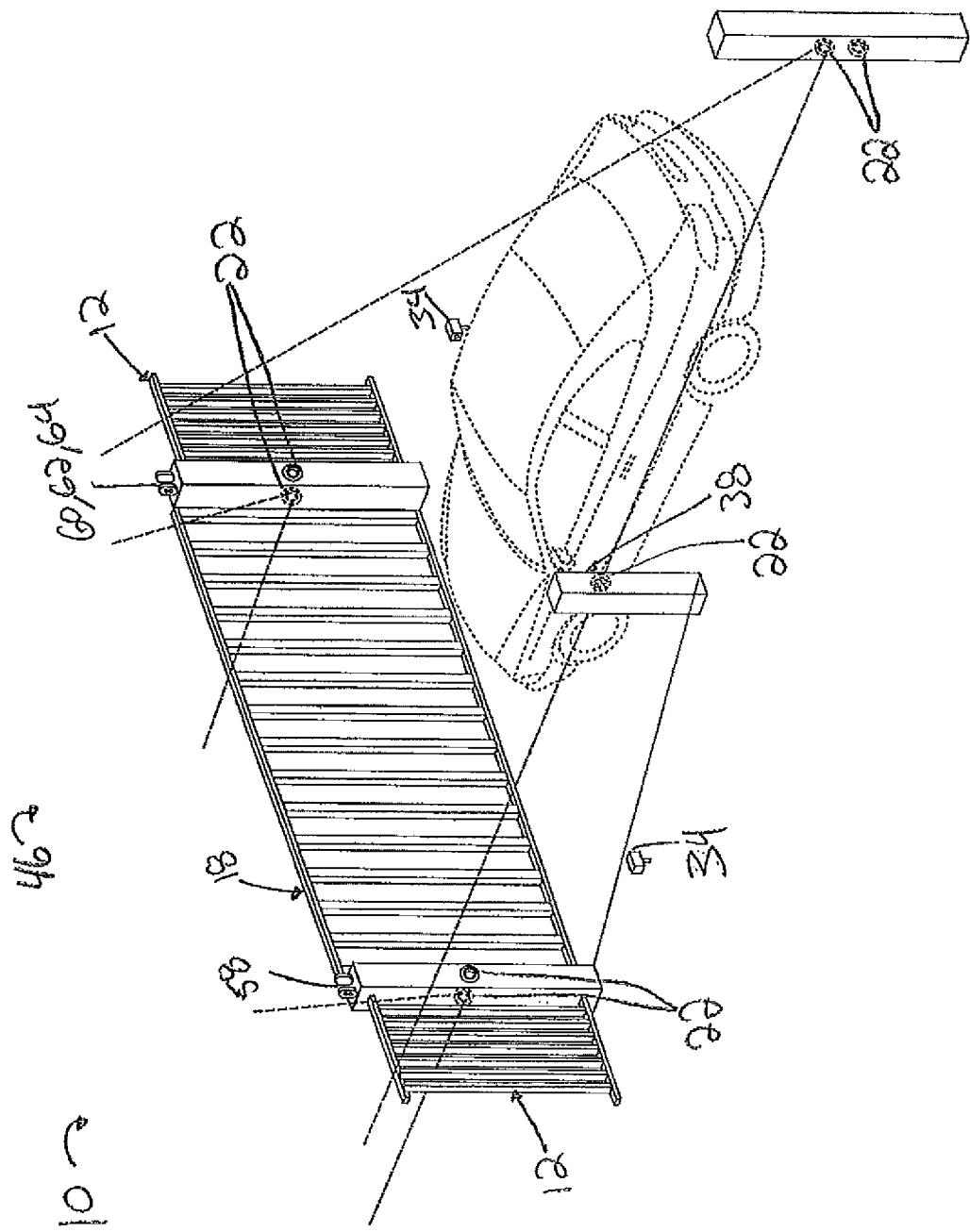
FIG. 4 is an elevated perspective view of the entrance gate demonstrating the line of sight of various cameras.

Referring to FIGS. 1-5, a virtual guard gate for a gated community 10 is shown. The virtual guard gate for a gated community 10 is used in combination with a fence 12 which is coupled to an entrance gate 18. In the preferred embodiment, the entrance gate 18 also acts as an exit gate, although it should be clear that substantial benefit could be derived from an alternative embodiment of the present invention in which a separate exit gate exists. The virtual guard gate for a gated community 10 may be employed in an existing gated community having unmanned entrance gates 18 or it may be used to replace the security agents currently being used at manned entrance gate of existing gated communities. Alternatively, the virtual guard gate for a gated community 10 may be instead in new gated communities being constructed.

The virtual guard gate for a gated community 10 has at least one camera 22 capable of recording the license plate of a vehicle or the facial features of an individual seeking entrance into the community located in close proximity to the entrance gate 18. In general, multiple cameras 22 are used so that both the license plate and facial features of the individuals seeking access are captured. Cameras 22 may also be positioned near the entrance gate 18 to monitor the entrance gate 18 to capture images of individuals who may be vandalizing the entrance gate 18, unauthorized individuals trying to climb over or get through the entrance gate 18 when closed, and the like. Similarly, additional cameras 22 may be used to record the license plate of a vehicle and the facial features of an individual exiting the gated community 46.

Figure 6:
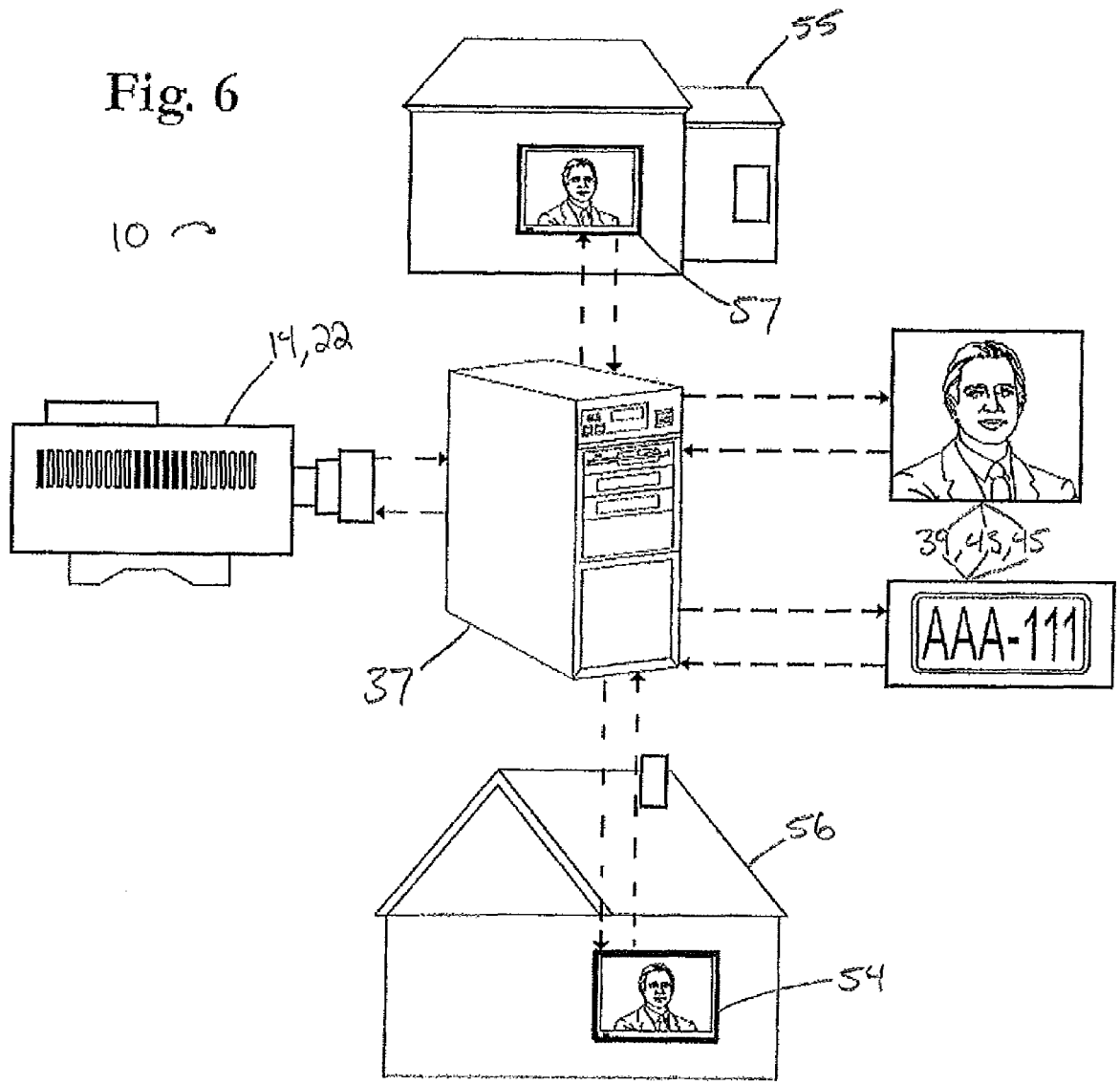
FIG. 6 demonstrates communication of the cameras with a server, communication of the server with a home within the community, communication of the server with the monitoring station, and communication of the server with the list of authorized vehicles and individuals and the list of individuals and vehicles within the gated community.

The cameras 22 are coupled to a server 37 (shown in FIG. 6). The cameras 22 transmit the captured images to the server 37. The server 37 analyzes the captured images and is capable of recognizing faces of individuals in the vehicle and characters on a license plate of the vehicle to determine whether the vehicle or individual has previously been entered into the server 37 and are authorized for entry into the gated community 46.

Referring to the FIG. 6, the images captured by the cameras 22 are then sent to the server 37 and compared to a database 39 of authorized individuals and vehicles. If the individual or vehicle is found to be authorized by the database 39, then the entry gate 18 is opened. Furthermore, the data representing the authorized individual or vehicle is stored in the server 37 on a database 43 of individuals and vehicles within the gated community 46. Similarly, the camera 22 which captures the images of the facial features of individuals and license plates of vehicles exiting the gated community 46 sends the information to the server 37, which then removes those individuals and vehicles from the list 43 of individuals and vehicles within the gated community 46. Thus, the server 37 will store information related to the individuals and the vehicles within the gated community 46.

The virtual guard gate for a gated community 10 may have a tag reader 23 located near the entrance gate 18. In accordance with one embodiment, the tag reader 23 is an RFID tag reader. The tag reader 23 will monitor for an identification tag which may be placed on the vehicle of people living in the gated community 46. The identification tag will only be given to authorized individuals gated community 46. If the tag reader 23 senses an identification tag when a vehicle approaches the entrance gate 18, the entrance gate 18 automatically open.

In close proximity to the entrance gate 18 is a photoelectric entrance beam 34. The photoelectric entrance beam 34 is used for determining when the rearmost portion of an authorized vehicle has passed beyond a stopping device 50 (shown in FIG. 2). Once the photoelectric entrance beam 34 determines that the rearmost portion of an authorized vehicle has passed beyond a stopping device 50, a signal is sent to the stopping device 50 which raises the stopping device 50 to ensure that no vehicle enters behind the authorized vehicle without having undergone the authorization process. In the preferred embodiment, the stopping device 50 is a vertical stop barrier, but it should be clear that substantial benefit could be derived from an alternative embodiment of the present invention in which the stopping device 50 is a severe tire damage device. The stopping device 50 remains up until the entrance gate 18 closes, at which point the stopping device 50 lowers.

Figure 5:
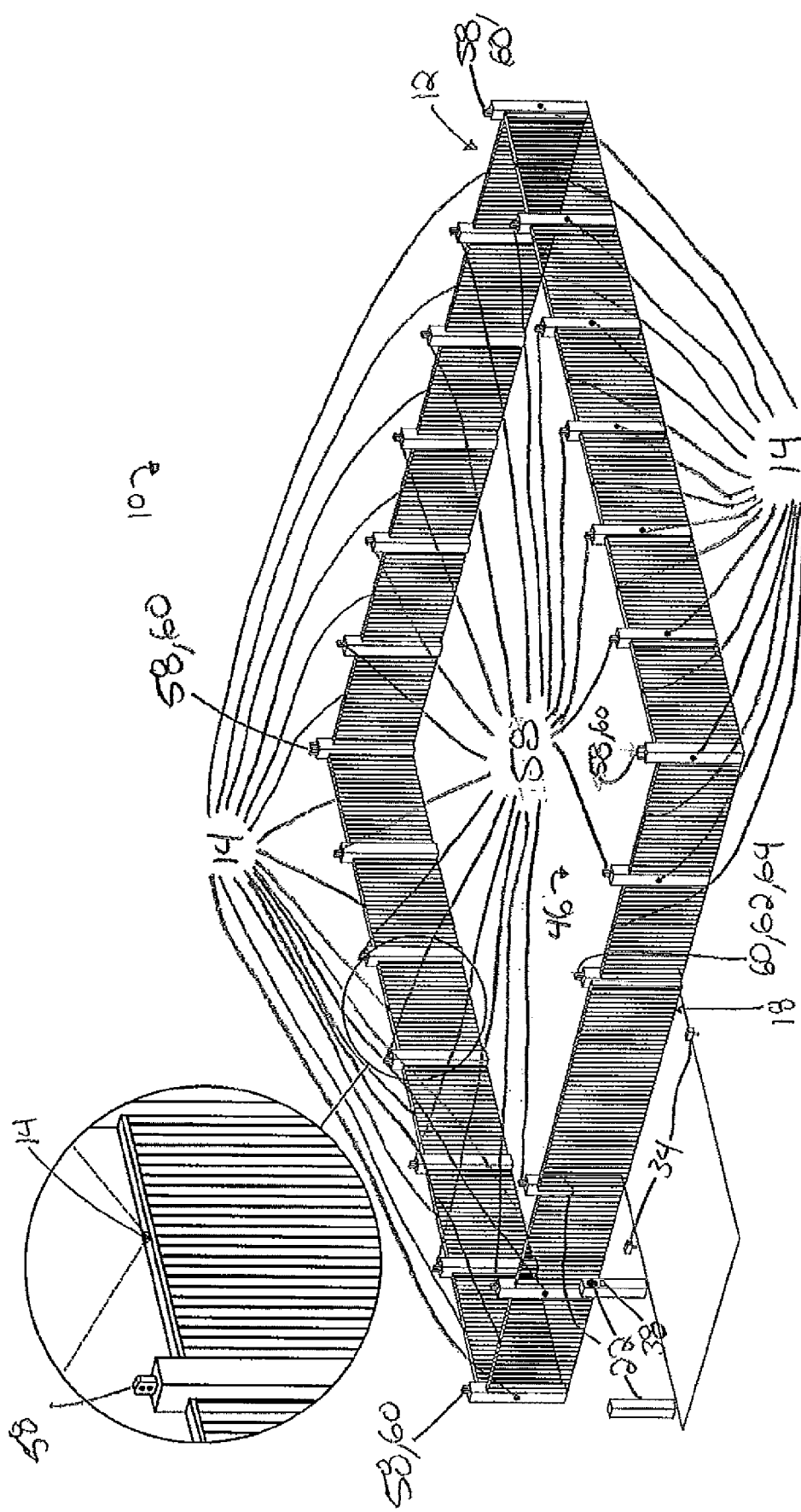
FIG. 5 is an elevated perspective view of the gated community with the entrance gate of the gated community in the foreground, and with a blow-up view of the monitoring cameras positioned on the fence of the gated community.

Referring to FIG. 5, positioned about the fence 12 is a plurality of monitoring cameras 14 and at least one photoelectric beam 16. The photoelectric beam 16 is directed around the perimeter of the fence 12. The monitoring cameras 14 and at least one photoelectric beam 16 are used to prevent unauthorized individuals from climbing over the fence 12 around the gated community 46. In the preferred embodiment, the monitoring cameras 14 are directed upwardly as to not contain any of the structures contained within the gated community 46 so as to eliminate privacy concerns. However, it should be clear that substantial benefit could be derived from an alternative embodiment of the present invention in which the monitoring cameras 14 are differently positioned. In general, a plurality of photoelectric beams 16 is used wherein the photoelectric beams 16 run in a horizontal plane on top of one another. The photoelectric beams 16 run parallel to, and on top of, the fence 12, and have a sufficient distance between them to allow the passage of a small animal, such as a cat or a bird, over the fence 12 of the gated community 46 while breaking only one of the photoelectric beams 16. This prevents false triggering of the virtual guard gate for a gated community 10. If multiple photoelectric beams 16 are broken, the virtual guard gate for a gated community 10 activates at least one monitoring camera 14 to capture images of the area where the photoelectric beams 16 were broken while putting the virtual guard gate for a gated community 10 in an alarm mode. In the preferred embodiment, any facial images captured by the monitoring cameras 14 are transmitted to the server 37 for analysis so that the server 37 may possibly identify the unauthorized individual.

In a preferred embodiment of the present invention, the photoelectric beams 16 originate from a single generating source 62 and are directed around the fence 12 and entrance gate 18 of the gated community 46 using a plurality of partially transparent yet partially reflective mirrors 58 and reflective mirrors 60.

The following describes a three sided perimeter having three sections, although it should be clear that substantial benefit could be derived from an alternative embodiment of the present invention in which additional or fewer sides and/or sections exist. In the same area of the generating source 62 is a detecting source 64 capable of detecting varying beam intensity. The generating source 62 projects the photoelectric beams 16 toward a first partially transparent yet partially reflective mirror 58a. In the preferred embodiment, the partially transparent yet partially reflective mirrors 58 ideally have a 1 to 1 transmissitivity to reflectivity ratio on their leading edge, and a maximum transmissitivity and minimum reflectivity on their trailing edge, although it should be clear that substantial benefit could be derived from an alternative embodiment of the present invention in which the partially transparent yet partially reflective mirrors 58 have different properties. The partially transparent yet partially reflective mirrors 58 are each coupled to a reflective mirror 60 for redirection of the photoelectric beams 16, the reflective mirrors 60 ideally having a maximum reflectivity. The first reflective mirror 60a redirects the transmitted portion 16a of the photoelectric beams 16 passing through the first partially transparent yet partially reflective mirror 58a toward the second partially transparent yet partially reflective mirror 58b. Accordingly, a reflected portion 16b of the photoelectric beams 16 is returned from the first partially transparent yet partially reflective mirror 58a to the detecting source 64. The transmitted portion 16a travels toward the second partially transparent yet partially reflective mirror 58b. Similarly, the transmitted portion 16a has an additional transmitted portion 16c as well as a reflected portion 16d that is returned back to the detecting source 64 via the first reflective mirror 60a and through the first partially transparent yet partially reflective mirror 58a. Accordingly, the intensity perceived by the detecting source 64 is a combination of the reflected portion 16d and the reflected portion 16b. The additional transmitted portion 16c is then redirected by a second reflective mirror 60b toward a terminal reflective mirror 60c. The additional transmitted portion then travels back toward the detecting source 64 via the second reflective mirror 60b, through the second partially transparent yet partially reflective mirror 58b, being redirected by the first reflective mirror 60a, and passing through the first partially transparent yet partially reflective mirror 58a, resulting in the intensity perceived by the detecting source 64 being the combination of the additional transmitted portion 16c with the combined intensity of 16b and 16d.

This causes the intensity perceived by the detecting source 64 to be of a different level for each scenario involving a different section in which the photoelectric beams 16 are interrupted. If the photoelectric beams 16 are interrupted between the generating source 62 and the first partially transparent yet partially reflective mirror 58a, no beam intensity is detected. If the photoelectric beams 16 are interrupted between the first partially transparent yet partially reflective mirror 58a and the second partially transparent yet partially reflective mirror 58b, only 16b is detected. If the plurality of photoelectric beams 16 are interrupted between the second partially transparent yet partially reflective mirror 58b and terminal reflective mirror 60c, 16b plus 16d is detected. And if the plurality of photoelectric beams 16 is uninterrupted, then 16b plus 16d plus 16c is detected. This allows the virtual guard gate for a gated community 10 to use a common area for generating and detecting the plurality of photoelectric beams 16 while still being able to determine which section of the fence 12 has been breached. It should be noted that different embodiments may create additional sections through the use of additional partially transparent yet partially reflective mirrors 58 and reflective mirrors 60.

Referring to FIGS. 1-5, in proximity to the entrance gate 18 is a directory device 38 which contains a list 45 of each family name of each home 56 (shown in FIG. 6) within the gated community 46, and enables an individual seeking authorization to communicate with an individual on the list 45 or the monitoring station 55 (shown in FIG. 6). Once an individual is selected from the list 45, the individual is alerted via a receiver 54 (shown in FIG. 6) within their home 56 (shown in FIG. 6) that an unauthorized individual is requesting access. The individual is also able to view images of the entrance gate 18, and therefore the individual requesting authorization, via the receiver 54. The individual from whom access authorization is requested may then open the entrance gate 18 using an access device.

Referring to FIG. 6, a flow diagram relating to the information and data exchanged between the different entities and objects that make up the invention is shown. The various cameras 14 and 22 are represented by the image of a single camera, which is in constant communication with the server 37. The server 37 is in constant communication with, and is capable of manipulating, the list 39 of authorized individuals and license plates, the list 43 of individuals and vehicles within the gated community 46, and the list 45 of each family name of each home within the gated community 46.

While embodiments of the disclosure have been described in terms of various specific embodiments, those skilled in the art will recognize that the embodiments of the disclosure can be practiced with modifications within the spirit and scope of the claims, and will also recognize that different features of different embodiments may be combined and incorporated into other embodiments.

What is claimed is:

1. A virtual guard gate for a gated community comprising:
   at least one camera positioned proximate an entrance gate of the gated community;
   a monitoring station monitor for displaying images captured by said at least one camera located in an off site monitoring station;
   receivers located in a plurality of homes of the gated community for receiving the images captured by said at least one camera;
   an access device located in said monitoring station and in each house within said gated community for opening the entrance gate when said images have been verified by one of an individual in said monitoring station or in one of the homes;
   a server located in said monitoring station coupled to said at least one camera;
   a first database stored in said server and storing registered license plates and associated photos of authorized individuals of said gated community, wherein said server compares the images captured by said at least one camera and sends a signal for opening said entrance gate when said at least one camera captures an image of an authorized vehicle or individual seeking access;
   a stopping device located proximate said entrance gate, the stopping device allowing a single vehicle to proceed through the entrance gate at a time;
   a sensor for monitoring a rearmost portion of said single vehicle and to send a signal to activate said stopping device; wherein said sensor is at least one photoelectric entrance beam, said photoelectric entrance beam capable of detecting when a rearmost portion of a vehicle entering said entrance gate has cleared said stopping device, said stopping device raises behind said rearmost portion of a vehicle when said at least one photoelectric entrance beam detects said rearmost portion of said vehicle has passed said stopping device and retracts when said entrance gate has closed; and
   a directory device proximate said entrance gate containing a family name of each home and enabling communication with said monitoring station and with a selected home.

2. The virtual guard gate for a gated community of claim 1 further comprising a second database stored in said server for storing license plates and time and date data of when vehicles enter and exit said gated community.

3. The virtual guard gate for a gated community of claim 1 further comprising a photoelectric beam system attached to a fence around a perimeter of said gated community and generating at least one photoelectric beam enclosing said gated community, said photoelectric beam system sending an alarm signal to the monitoring station when said at least one photoelectric beam of the photoelectric beam system are interrupted.

4. The virtual guard gate for a gated community of claim 3 further comprising at least one fence monitoring camera attached to the fence around the perimeter of said gated community wherein said at least one fence monitoring camera is activated in response to said at least one photoelectric beam of the photoelectric beam system being interrupted, said fence monitoring camera focused upon an area proximate a point in which said at least one photoelectric beam are interrupted.

5. The virtual guard gate for a gated community of claim 4 wherein said at least one fence monitoring camera is directed upwardly.

6. The virtual guard gate for a gated community of claim 3 wherein said photoelectric beam system comprises:
   a photoelectric beam generating source capable of generating a single photoelectric beam;
   a photoelectric beam prism capable of separating said single photoelectric beam into a plurality of photoelectric beams, said plurality of photoelectric beams being in a vertical plane;
   at least one beam-directing device capable of reflecting a first portion of said plurality of photoelectric beams and capable of redirecting a second portion of said plurality of photoelectric beams; and
   a detecting source capable of detecting said point in which more than one of said plurality of photoelectric beams are interrupted.

* * * * *